US011416072B1

(12) United States Patent
Singh

(10) Patent No.: US 11,416,072 B1
(45) Date of Patent: Aug. 16, 2022

(54) DATA ENTRY APPARATUS LEVERAGING SMART CONTACT LENSES

(71) Applicant: Bank of America Corporation, Charlotte, NC (US)

(72) Inventor: Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/380,776

(22) Filed: Jul. 20, 2021

(51) Int. Cl.
| G06F 3/01 | (2006.01) |
| G02C 7/04 | (2006.01) |
| G02C 11/00 | (2006.01) |
| G02B 27/01 | (2006.01) |
| G06F 3/04842 | (2022.01) |
| G06F 21/32 | (2013.01) |

(52) U.S. Cl.
CPC ............. G06F 3/013 (2013.01); G02B 27/01 (2013.01); G02C 7/04 (2013.01); G02C 11/10 (2013.01); G06F 3/04842 (2013.01); G06F 21/32 (2013.01); *G02B 2027/014* (2013.01)

(58) Field of Classification Search
None
See application file for complete search history.

(56) References Cited

U.S. PATENT DOCUMENTS

| 5,351,339 A | 10/1994 | Reuber et al. |
| 9,503,146 B1 | 11/2016 | Chen |
| 10,101,599 B1 | 10/2018 | Greeson |
| 10,247,947 B2 | 4/2019 | Van Heugten |
| 10,288,902 B2 | 5/2019 | Liao |
| 10,330,957 B2 | 6/2019 | Boss et al. |
| 10,353,463 B2 | 7/2019 | Shtukater |
| 10,359,648 B2 | 7/2019 | Kim et al. |
| 10,399,291 B2 | 9/2019 | Hahn et al. |
| 10,588,217 B2 | 3/2020 | Sun et al. |
| 10,656,438 B2 | 5/2020 | Liao |
| 10,678,071 B2 | 6/2020 | Boss et al. |
| 10,705,352 B2 | 7/2020 | Greeson |
| 10,732,416 B2 | 8/2020 | Van Heugten |
| 10,754,178 B2 | 8/2020 | Kim et al. |
| 10,823,979 B2 | 11/2020 | Liao |
| 10,845,620 B2 | 11/2020 | Shtukater |

(Continued)

OTHER PUBLICATIONS

"Eye Tracking," https://en.wikipedia.org/wiki/Eye_tracking, Wikimedia Foundation, Inc., Jun. 8, 2021.

(Continued)

*Primary Examiner* — Parul H Gupta
(74) *Attorney, Agent, or Firm* — Weiss & Arons LLP

(57) ABSTRACT

Systems and methods for transferring data via a smart contact lens from a first user interface ("UI") to a second UI is provided. Methods may include triggering a tracking of the focus of the user's eyes on the first UI and further tracking a start point and an end point of the focus of the user's eyes based on detection of deliberate blink gestures. Methods may further include capturing a segment of data within the start point of focus and the end point of focus and storing the segment of data in memory on the smart contact lenses. Methods may further include updating the second UI based on an instruction in a data packet transmitted to the second UI, by inputting the segment of data at a point of focus of the user's eye on the second UI.

15 Claims, 4 Drawing Sheets

(56) References Cited

U.S. PATENT DOCUMENTS

| | | | |
|---|---|---|---|
| 10,899,014 B2 | 1/2021 | Du et al. |
| 10,901,505 B1 | 1/2021 | Haine et al. |
| 10,942,369 B2 | 3/2021 | Pinel et al. |
| 10,963,045 B2 | 3/2021 | Weldmariam et al. |
| 2014/0353501 A1 | 12/2014 | Fantone et al. |
| 2015/0362757 A1 | 12/2015 | Fu |
| 2016/0091737 A1 | 3/2016 | Kim et al. |
| 2016/0299354 A1 | 10/2016 | Shtukater |
| 2016/0324451 A1 | 11/2016 | Young |
| 2017/0023793 A1 | 1/2017 | Shtukater |
| 2017/0270636 A1 | 9/2017 | Shtukater |
| 2017/0371184 A1 | 12/2017 | Shtukater |
| 2018/0210235 A1* | 7/2018 | Boss .................... G02C 11/10 |
| 2018/0224669 A1 | 8/2018 | Shtukater |
| 2018/0361588 A1 | 12/2018 | Du et al. |
| 2019/0025607 A1 | 1/2019 | Liao |
| 2019/0025608 A1 | 1/2019 | Liao |
| 2019/0025609 A1 | 1/2019 | Liao |
| 2019/0033618 A1 | 1/2019 | Choi et al. |
| 2019/0094570 A1 | 3/2019 | Jow et al. |
| 2019/0132732 A1* | 5/2019 | Bharti ................ G06F 3/04883 |
| 2019/0179165 A1 | 6/2019 | Shtukater |
| 2019/0204625 A1 | 7/2019 | Greeson |
| 2019/0227348 A1 | 7/2019 | Boss et al. |
| 2019/0250432 A1 | 8/2019 | Kim et al. |
| 2019/0282094 A1 | 9/2019 | Lamrani et al. |
| 2019/0293964 A1 | 9/2019 | Takaki et al. |
| 2019/0332168 A1 | 10/2019 | Weldemariam et al. |
| 2020/0022256 A1 | 1/2020 | Sun et al. |
| 2020/0026097 A1 | 1/2020 | Pinel et al. |
| 2020/0116897 A1 | 4/2020 | Schadlu et al. |
| 2020/0138702 A1 | 5/2020 | Kim et al. |
| 2020/0162698 A1 | 5/2020 | Rakshit et al. |
| 2020/0201074 A1 | 6/2020 | Kim et al. |
| 2020/0319479 A1 | 10/2020 | Hahn et al. |
| 2020/0333637 A1 | 10/2020 | Greeson |
| 2020/0400957 A1 | 12/2020 | Van Heugten |
| 2021/0007643 A1 | 1/2021 | Lamrani et al. |
| 2021/0081952 A1 | 3/2021 | Rakshit |
| 2021/0081953 A1 | 3/2021 | Rakshit |
| 2021/0124415 A1 | 4/2021 | Haine et al. |

OTHER PUBLICATIONS

"LiFi—What It Is, How It Works, What It Provides, How to Apply, and Its Future Prospects," https://www.led-professional.com/resources-1/articles/lifi-what-it-is-how-it-works-what-it-provides-how-to-apply-and-its-future-prospects, LED Professional, Jan. 15, 2018.

Hiren, "Global Smart Contact Lenses Market: Industry Analysis and Forecast (2021-2027)—by Type, Application and Region," https://ksusentinel.com/2021/04/14/global-smart-contact-lenses-market-industry-analysis-and-forecast-2021-2027-by-type-application-and-region/, Apr. 14, 2021.

"This Is Eye Tracking," https://www.tobii.com/group/about/this-is-eye-tracking/, Tobii AB, Retrieved on Jun. 29, 2021.

"LiFi," https://en.wikipedia.org/wiki/Li-fi. Wikimedia Foundation, Inc., Jun. 25, 2021.

"Sony's Smart Contact Lens Will Blow Your Mind Away!" https://medium.com/chip-monks/sonys-smart-contact-lens-will-blow-your-mind-away-308f3d6da687, Chip-Monks, Jul. 5, 2017.

* cited by examiner

DATA ENTRY APPARATUS LEVERAGING SMART CONTACT LENSES

FIELD OF TECHNOLOGY

Aspects of the disclosure relate to providing systems and methods for use with smart contact lenses. In particular, the disclosure relates to systems and methods for using smart contact lenses for data entry operations.

BACKGROUND OF THE DISCLOSURE

Data entry is a basic, yet important, part of the functioning of any small or large entity, organization or company. Every detail is important, and accuracy is crucial in the data entry field.

A very common function of data entry includes the copying and pasting of data from one user interface ("UI") to one or more additional UI's. Copying data is typically done by a data entry operator using a pointing device i.e.—a computer mouse. The operator may, using the computer mouse, highlight the text, copy the text segment and then paste the text segment onto one or more fields within one or more additional UI's. This may be a very tedious and time consuming job. Furthermore, accuracy may degrade over time because of the repetitive nature of the tasks involved It is desirable, therefore, to provide systems and methods that leverage smart contact lenses to capture data from one UI and paste the data into one or more additional UI's.

SUMMARY OF THE DISCLOSURE

A smart contact lens configured for capturing data from a first user interface ("UI") and transmitting the data to a second UI is provided. The transmission may be leveraged by light fidelity ("Lifi"). The smart contact lens may be located on an eye of a user.

The smart contact lens may include a micro camera operable to capture data from the first UI and from the second UI. The smart contact lens may further include a memory unit for storing the data captured from the first UI and from the second UI.

The smart contact lens may also include a sensor configured to capture the user's point of focus. The smart contact lens may further include a loop antenna configured to enable radio frequency communication.

The smart contact lens may include a light emitting diode ("LED") attached to a substrate on the smart contact lens. The LED may be connected to a microcontroller. The LED may be operable to transmit the data captured at the first UI to the second terminal.

The smart contact lens may include a microprocessor operable to capture, store and transmit data to a receiver at the first terminal and the second terminal.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
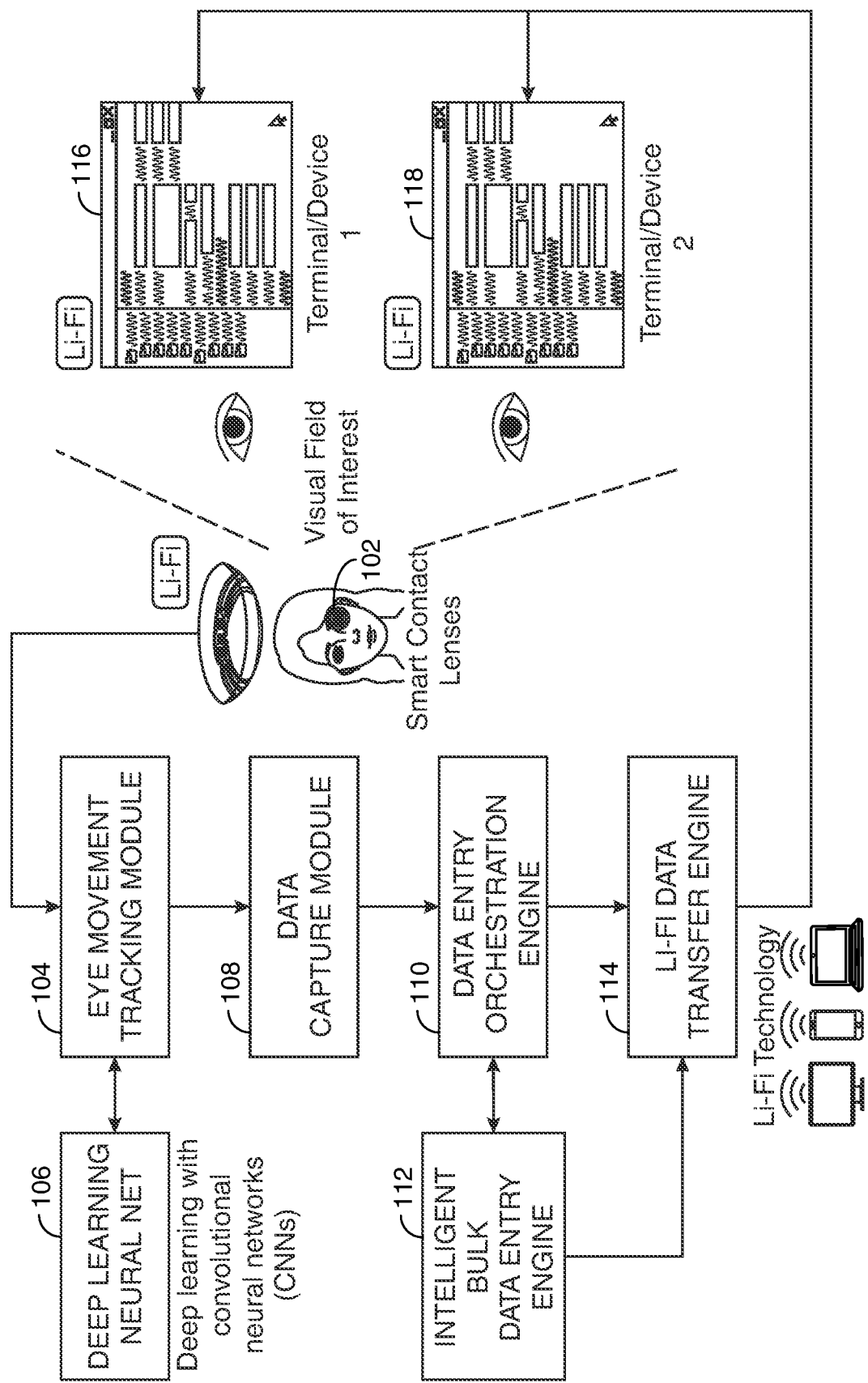
FIG. 1 shows an illustrative system in accordance with principles of the disclosure.

A data entry system leveraging smart contact lenses is provided. The data entry system may include a first terminal supporting a first user interface ("UI"), a second terminal supporting a second UI and one or more smart contact lenses. The smart contact lens may be enabled to communicate and transmit data using light fidelity ("Lifi").

The first terminal may include a Lifi receiver. The second UI may also include a Lifi receiver.

A terminal for the purposes of the disclosure may include a computing device. The computing device may be independent from another computing device. The computing device may be a computer, Ipad, laptop, tablet, mobile device and any other suitable computing device.

The smart contact lens may be configured for location on a user's eye. For the purposes of this disclosure, a smart contact lens, may be understood to mean wearable contact lenses. A smart contact lens may be made from materials used for wearable contact lenses such as soft and pliable hydrophilic plastic.

In some embodiments, the smart contact lens may be a first smart contact lens on a first eye. The system may also include a second smart contact lens on a second eye. The two smart contact lenses may be a pair of smart contact lenses.

A smart contact lens may include one or more internal processors. The one or more internal processors may include one or more microprocessors.

In addition to the processors, the smart contact lens may also include hardware components associated with conventional contact lenses.

The smart contact lens may include a micro camera. The micro camera may be operable to capture data from the first UI and from the second UI and from any additional UI that may be included in the system.

The smart contact lens may include a memory unit. The memory unit may be for storing the data captured from the first UI and from the second UI.

The smart contact lens may include one or more sensors. The sensors may be configured to capture a user's point of focus. Sensors may include the camera. Sensors may also include piezoelectric sensors, infrared sensor and/or an acceleration sensor. These micro electronic sensors may be configured to measure changes in pressure, temperature, acceleration and force. The smart contact lens may be configured to use the measurement and translate them into control instructions.

The smart contact lens may include an antenna. The antenna may be a loop antenna. The antenna may be configured to enable radio frequency communication.

The smart contact lens may include Lifi capabilities. The smart contact lens may include a light emitting diode ("LED"). The LED may be attached to a substrate on the smart contact lens. The LED may be connected to a microcontroller and/or a microprocessor. The LED may be operable to transmit the data captured at the first UI to the second terminal. The LED may be operable to transmit data captured from the second UI to the first terminal. The LED may be operable to transmit data to any one or more additional computing devices.

Lifi is a two-way network protocol for high speed connectivity using light technology. LiFi is a light-based communication system capable of transmitting data wirelessly at high speed using light emitting diodes (LEDs). LiFi transmission speeds may be more than one hundred times faster than conventional WiFi. LiFi infrastructure is also relatively simple, in contrast with the radio transmitters and antennae required for WiFi communications. The speed of LiFi transfer may enable real-time parallel processing of large-scale files, vastly improving processing efficiency. The speed of LiFi transmission may also limit data leakage and thus protect against adversarial attacks during the data transmission process.

LiFi may capture data in modulated light frequencies. The driver-circuit in LED bulbs may encode and transmit data by switching the LED on and off at rates so fast that the flickering is indiscernible to the human eye. The data may be decoded by an optical sensor on the receiving end and converted back into an electronic data stream.

In some embodiments, LED bulbs may be dimmed to levels below human visibility while still emitting enough light to carry data. LiFi technology presents a number of advantages over conventional WiFi. One advantage is transmission speed. LiFi transfers may occur at speeds 100 times faster than conventional WiFi.

Another advantage is capacity. WiFi relies on the radio frequency spectrum which is subject to congestion and slowing due to high traffic. LiFi, on the other hand, uses the visible light spectrum which is 10,000 times larger than the radio bandwidths and is therefore not limited by spectrum capacity.

While WiFi frequencies may eventually become crowded and slower when large amounts of data are transferred, LiFi is able to deliver consistent large data transfers. Additionally, unlike WiFi, LiFi frequencies may be used in electromagnetic sensitive areas without causing interference. LiFi infrastructure is also relatively simple, in contrast with the radio transmitters and antennae required for WiFi communications.

The limited hardware required for LiFi communications also improves energy efficiency.

The smart contact lens may be exposed to light, mechanical movement of blinking and electromagnetic conduction and may harvest energy from these sources.

The microprocessor may be operable to capture, store and transmit data to a receiver at the first terminal and the second terminal.

One or more software modules may execute on the processors. The one or more software modules may be stored in a memory located within the smart contact lens. The one or more software modules may, in the alternative, be referred to as applications. The applications may enable the smart contact lens to execute various tasks.

The microprocessor may execute an eye movement tracking application. The eye movement tracking application may execute an eye tracker application. Sensors may be controlled by the eye tracking application executed on the smart contact lenses microprocessor. Eye position data detected by the sensors may be collected by the eye tracking application. Eye position data detected by the sensors may be stored in a memory embedded in the smart contact lenses. Sensors for tracking user eye position may include cameras. In some embodiments, the cameras may be combined with illuminators. The illuminators may include a near infrared light source or any suitable light source.

One method of tracking user eye position involves pupil center corneal reflection (PCCR). PCCR is a method for remote, non-intrusive eye tracking. A light source illuminates the eye causing visible reflections and a camera captures an image of the reflections. A vector is calculated based on the angle between the cornea and pupil reflections. The direction of the vector combined with other geometrical features of the reflections may be used to determine eye position. Eye position may include gaze direction.

In some embodiments, the smart contact lenses may include multiple cameras per eye for increased accuracy in measuring gaze direction. The smart contact lens may include accelerometer, gyroscope and magnetometer sensors in order to provide differentiation between head and eye movements. The smart contact lens may include slippage compensation and persistent calibration to enable integrating the smart contact lenses with the development platform may enable a user to develop applications in a hands-free manner.

The system may include a camera associated with the external computing device display. The camera may determine the proximity of the smart contact lens to the display.

In some embodiments, the smart contact lenses may continuously transmit eye position data while in proximity to the external display. In some embodiments, the smart contact lenses may transmit the eye position data at periodic intervals.

In some embodiments, the smart contact lens may terminate or pause the transmission when the smart contact lens is no longer within a predetermined proximity to the display. In some embodiments, the smart contact lens may terminate or pause the transmission when the sensor fails to detect an eye position associated with visual focus on the display for a predetermined period of time.

The camera associated with the external computing device may determine position of the user head with respect to the display. The user head position may be periodically or continuously determined. Head position data may be synchronized with eye position data from the smart contact lens sensor. User gaze direction combined with user head position may be extrapolated to determine a fixation point on the display and identify the corresponding screen coordinates.

The external computing device may include a smart contact lens interface. The smart contact lens interface may receive eye position data from the smart contact lens. The smart contact lens interface may determine the relevance of the eye position data. The determination may be based on a level of visual focus. Eye position data may be associated with visual focus based on any suitable metric.

Metrics for tracking eye position may include a determination of gaze points. One gaze point may equal one raw sample captured by the eye tracker. Fixation may occur when a gaze point is maintained for a specific amount of time. Fixation may be associated with visual focus. Fixation may be associated with threshold level of visual focus.

The eye movement tracking application may be configured to determine a focus of the user's eye on the first UI. The focus of the user's eye may be determined when the user's eye is focused in the direction of the first UI.

When a user's focus is determined to be within range of the first UI, the eye movement tracking application is further configured to determine a point of the focus of the user's eye on the first UI. The point of focus may be the location on the UI that includes data that the user may want to capture for a copy and paste operation. The point of focus may be directed to a data entry field associated with a data entry field identifier within the first UI.

Each UI may display a page of an application. An application may include one or more fillable forms. An application may be one page displayed on the UI. An application may include a plurality of pages. Each page may include a plurality of data entry fields and associated data entry field identifiers. The data entry field identifiers may be the name of the type of data entry field. The data entry field may include the value of the identifier. At the first UI, the value may be included in the data entry field. At the second UI, the data entry fields may be blank, and the values may be filled in using the smart contact lens.

The eye movement capturing application may detect a deliberate eye blink gesture while gazing at the point of focus. The deliberate eye blink gesture may be a blink of the eye that may be longer than an average blink of an eye. An average blink of an eye may be between 0.2 second and 0.4 seconds. When the blink of the eye is determined to be longer than the average blink, the eye movement capturing application may determine the blink to be a deliberate blink.

In response to the detection, the system may be configured to identify a data segment at the point of focus within the data entry field.

The data capturing application may then be executed. The data capturing application may be configured to capture the data segment and the associated data entry field identifier using the micro camera. The data segment and the associated data entry field identifier may be stored in the memory of the smart contact lens.

In response to a detection of the point of focus of the user's eye on the second UI, the eye movement tracking application may be further configured to detect a deliberate eye blink gesture while gazing at the point of focus on the second UI.

The LED at the smart contact lens may be configured to transmit a data packet to the second terminal. The data packet may be compiled at the smart contact lens. The data packet may include the data segment, the associated data entry field identifier from the smart contact lens and an instruction to update the second UI to incorporate the data segment at the point of focus of the user's eyes on the second UI.

The Lifi receiver at the second terminal may be configured to receive the data packet.

It should be appreciated that the Lifi receiver at the first terminal and the Lifi receiver at the second terminal made include a photodetector or a camera and upon receipt may be responsible for re-transcribing a luminous signal transmitted by the LED into an operational electrical signal.

A processor at the second terminal may be configured to update the second UI by inputting the data segment at the point of focus at the second UI.

In some embodiments, prior to capturing data from the first UI and/or the second UI, the system may be configured to initiate a pairing of the smart contact lens to each of the first and second terminal. The pairing may include authenticating the smart contact lens at the terminal. The Lifi receiver at the first terminal may receive, via the LED, a token i.e.—a password, stored at the smart contact lens. The token may then be verified at the terminal.

In some embodiments, the system may include a third terminal. The third terminal may support a third UI. The third UI may include a Lifi receiver. Following the inputting of the data segment at the point of focus at the second UI, the eye movement tracking module may be further configured to detect a deliberate eye blink gesture while gazing at a point of focus at the third UI. In response to the detection of the point of focus at the third UI, the Lifi data transfer engine may execute the LED to transmit a data packet compiled at the smart contact lens to the third terminal.

The data packet may include the data segment, the associated data entry field identifier from the smart contact lens and an instruction to update the third UI to incorporate the data segment at the point of focus of the user's eyes on the third UI. The Lifi receiver at the third terminal may be configured to receive the data packet. A processor at the third terminal may be configured to update the third UI by inputting the data segment at the point of focus at the third UI.

In some embodiments, prior to storing the data segment captured, the microprocessor may be configured to confirm an accuracy of the data segment. The confirming may include instructing a display on the smart contact lens to trigger an augmented reality display to a user of the smart contact lens of the data segment.

The user may view the data segment as an augmented reality display through the smart contact lens. When the data segment is accurate, the system may be configured to receive verification from the user by detecting a single deliberate eye blink gesture following the displaying of the data segment. In response to the single deliberate eye blink gesture, the data segment may be stored in memory of the smart contact lens.

In the event that the data segment is not accurate, the system may detect a double deliberate eye blink gesture. In response to the double deliberate eye blink gesture, the microprocessor may be configured to instruct the display to trigger the augmented reality display to the user confirming the deletion of the data segment. The system may be further configured to execute the data capturing application to determine a second point of focus of the user's eye on the first UI. When determining the second point of focus, the system may re-execute the eye movement tracking application to detect the point of focus of the user's eye at the first UI.

It should be appreciated that the system may not be limited to a single and double eye blink gestures. In some embodiments, the length of each deliberate eye blink gesture may be indicative of a point of focus. In other embodiments, multiple deliberate eye blink gestures may be indicative of a point of focus.

One or more non-transitory computer-readable media storing computer-executable instructions which, when executed by a processor on a computer system, perform a method for transferring data from a first light fidelity ("Lifi") enabled user interface ("UI") to a second Lifi enabled UI. The transferring may leverage smart contact lenses via Lifi transmission. The smart contact lenses may be positioned on a user's eyes.

It should be appreciated that the first UI may be located on a first computing device and the second UI may be located on a second computing device. The first and second computing device may be independent of each other and may not be wirelessly linked to each other.

The method may include detecting a focus of the user's eyes on the first UI. In response to the detecting, the method may include triggering a tracking of the focus of the user's eyes.

When a first deliberate blink gesture is identified, the method may include tracking a start point of the focus of the user's eyes. A deliberate blink gesture may be determined when a time period of a blink of the eyes is greater than a pre-determined time period. The pre-determined time period may be the average length of time of an eye blink.

When a second deliberate blink gesture is identified, the method may include tracking an end point of the focus of the user's eyes. The start point and end point may be tracked by tracking the x and y coordinates of the UI based on the focus of the user's eyes.

The method may further include capturing a segment of data between the start point of focus and the end point of focus. In some embodiments, the data segment may include the data at the start point and at the end point. In some embodiments, the data segment may include only the data between the start and the end point.

Following the capturing, the method may include storing the segment of data in memory on the smart contact lenses.

The method may further include detecting the focus of the user's eyes on the second UI. In response to the detecting, the method may include tracking a point of focus of the user's eyes on the second UI. The method may further include transmitting to the second UI, using an LED, a data packet. The data packet may include the segment of data stored in the memory. The data packet may also include the point of focus of the user's eyes on the second UI. The data packet may also include an instruction to update the second UI to incorporate the segment of data at the point of focus of the user's eyes on the second UI.

Following the receipt of the data packet, the method may further include updating the second UI based on the instruction by inputting the segment of data at the point of focus on the second UI.

Following the updating, the method may further include detecting the user's eye focus on a third UI of a third terminal. At the third UI, the method may include tracking a point of focus of the user's eyes on the third UI.

The method may further include transmitting the data packet from the memory to the third UI. Following transmitting of the segment of data into the third UI, the method may further include identifying pre-trained data associated with the data segment and automatically transmitting the data packet to a fourth, fifth and sixth UI based on the pre-trained data.

It should be appreciated that the segment of data may be within a data entry field associated with a data entry field identifier on the first UI. The method may include, prior to updating the second UI, verifying that the point of focus of the user's eyes on the second UI is pointing at a data entry field associated with a data entry field identifier correlating to the data entry field identifier on the first UI.

For example, when a data segment is copied from a data entry field identifier at the first UI listed as 'user ID', the method may include verifying that the point of focus detected at the second UI, is direct to a data entry field associated with the same data entry field identifier 'user ID' at the second UI.

In the event that the data entry field associated with a data entry field identifier on the second UI does not correlate to the data entry field identifier on the first UI, the method may include transmitting an error message on an augmented reality display of the smart contact lens. Following the transmitting, the method may include repeating the tracking of the point of focus of the user's eyes on the second UI.

In some embodiments, when the data entry field associated with a data entry field identifier on the second UI does not correlate to the data entry field identifier on the first UI, the method may include searching through each data entry field identifier on the second UI to identify a data entry field identifier correlating to the identifier of the first UI. When a correlating data entry field identifier is identified, the method may include transmitting the data packet to the second UI. The data packet may include the segment of data stored in the memory. The data packet may also include the identified correlating data entry field identifier. The data packet may also include an instruction to update the second UI to incorporate the segment of data at the data entry field associated with the identified correlating data entry field identifier on the second UI.

In some embodiments when the start point of the focus of the user's eyes is at a first data entry field on the first UI and the end point of the focus of the user's eyes is at a last data entry field on the first UI, the method may include performing a bulk capturing of the data. The bulk capturing may include capturing each segment of data within each data entry field on the first UI. The method may further include capturing, for each segment of data, an associated data entry field identifier displayed on the first UI. The method may further include storing each segment of data and the associated data entry field identifier on the smart contact lens.

Following the storing, the method may include detecting the focus of the user's eyes on the second UI. in response to the detecting, the method may include transmitting to the second UI using Lifi, a data packet. The data packet may include each segment of data and the associated data entry field identifier stored in the memory. The data packet may also include an instruction to update the second UI. The instruction may include for each segment of data being transmitted, inputting each segment of data on the second UI within a data entry field associated with a data entry field identifier correlating to the data entry field identifier displayed on the first UI.

In response to the receipt of the data packet by the processor at the second UI, the method may include updating the second UI based on the instruction.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Smart contact lens 102, smart contact lens 202 and smart contact lens 422, may have one or more features in common with the smart contact lens described herein. Additionally, features of smart contact lens described in connection with FIGS. 1-4 may be included in the smart contact lens described herein.

FIG. 1 shows an illustrative system in accordance with the invention. In FIG. 1, a smart contact lens user is shown wearing smart contact lens 102. Smart contact lens 102 is shown executing an eye movement tracking module 104, a data capture module 108, a data entry orchestration engine 110 and a Lifi data transfer engine 114 for copying data from a first UI 116 to a second UI 118.

Each of 104, 108, 110 and 114 may be executed on smart contact lens 102. In some embodiments, each of 104, 108, 110 and 114 may be executed on a remote server. Deep learning neural net 106 and intelligent bulk data entry engine 112 may be executed on smart contact lens 102 or on a remote server.

The smart contact lens and the remote server may comprise one or more computer systems and servers that include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory. The source database may be part of a computer system. The target database may be part of a computer system. It should be appreciated that when run on the smart contact lens, each hardware may be a micro version. Processors, receivers, transmitters, sensors and cameras and any other suitable hardware may be micro.

The smart contact lens and the remote server may include RAM, ROM, an input/output ("I/O") module and a non-transitory or non-volatile memory. Machine-readable memory may store information in machine-readable data structures. The I/O module may include a microphone, button and/or touch screen which may accept user-provided input. The I/O module may include a speaker for providing audio output and/or a video display for providing textual, audiovisual and/or graphical output.

Software applications executed by the smart contact lens and the remote server may be stored within the non-transitory memory and/or other storage medium. Software applications may provide instructions to the processor that enable the apparatus to perform various functions. The instructions may include any of the smart contact lens methods and processes described herein. For example, the non-transitory memory may store software applications such as the eye movement tracking module and data capture module. Alternatively, some or all of computer executable instructions of a software application may be embodied in hardware or firmware components of a computer system or server.

Software applications may include computer executable instructions for invoking user functionality related to communication, such as email, short message service ("SMS"), and voice input and speech recognition applications. Software application programs may utilize one or more algorithms that process received executable instructions, perform power management routines or other suitable tasks.

Software applications may utilize computer-executable instructions, such as program modules, executed by a processor. Generally, program modules include routines, programs, objects, components, data structures, etc. that perform particular tasks or implement particular abstract data types. A computing system may be operational with distributed computing environments where tasks are performed by remote processing devices that are linked through a communications network. In a distributed computing environment, program modules may be located in both local and remote computer storage media including memory storage devices. Computing systems may rely on a network of remote servers hosted on the Internet to store, manage, and process data (e.g., "cloud computing" and/or "fog computing").

The smart contact lens and the remote server may be part of two or more networks. The smart contact lens and the remote server may support establishing network connections to one or more remote computing systems. Illustrative network connections may include a local area network ("LAN") and a wide area network ("WAN"). When used in a LAN networking environment, a computing system may be connected to the LAN through a network interface or adapter. A computing system may include a communication circuit. The communication circuit may include a network interface card or adapter.

When used in a WAN networking environment, the smart contact lens and the remote server may include a modem, antenna or other circuitry for establishing communications over a WAN, such as the Internet. The communication circuit may include a modem and/or antenna.

The existence of any of various well-known protocols such as TCP/IP, Ethernet, FTP, HTTP and the like is presumed, and a computing system may be operated in a client-server configuration to permit a user to retrieve web pages from a web-based server. Web browsers can be used to display and manipulate data on web pages.

Computer systems and servers may include components, such as a display, battery, speaker, and antennas. Components of a computer system and server may be linked by a system bus, wirelessly or by other suitable interconnections. Components of a computer system and server may be present on one or more circuit boards.

The system may include a first terminal 116. The first terminal may be a computing device. The first terminal 116 may include a first UI. The first UI may display data entry field identifiers and data entry fields. The first terminal 116 may be Lifi enabled and may include a Lifi receptor.

The system may include a second terminal 118. The second terminal may be a computing device. The second terminal 118 may include a second UI. The second UI may display data entry field identifiers and data entry fields. The second terminal 118 may also be Lifi enabled and may include a Lifi receptor.

It should be appreciated that first terminal 116 and second terminal 118 may be within a visual field of interest of smart contact lens 102.

Smart contact lenses 102 may enable a copying of data from one computing device to another computing device.

Smart contact lenses 102 may execute the eye movement tracking module 104 to track the focus of the user's eye of smart contact lenses 102. The eye movement tracking module 104 may implement deep learning with convolutional neural networks ("CNNs") to enable eye tracking.

At 104, eye movement tracking module may track a focus of the user's eyes. The user may be looking at the first UI at 116. Once the user identifies the field that the user will be copying, the eye movement tracking module may detect a blink of the user's eyes while gazing at the data entry field. Using any suitable eye tracker application, the eye movement tracking module may identify the segment of data the user's eye is focusing on.

At 108, the data capture module may capture the data segment identified by the eye movement tracking module. The capturing may be performed by the micro camera on the smart contact lenses. The captured data may then be stored in memory on the smart contact lenses.

The system may include a data orchestration engine 110. Data entry orchestration engine 110 may be used to manage and track operations relating to the data entry at each terminal. Data entry orchestration engine 110 may ensure that the user's eye focus position and tracking is in synchronization with the data segment captured. Additionally, it may ensure that the data segment captured is appropriately transferred to the second terminal. Each data entry activity and the sequence may be tracked by the data entry orchestration engine.

Data orchestration engine 110 may use deep learning and tiny machine learning ("ML"). Deep learning and Tiny ML may refer to machine learning processes that can be performed on the microprocessor without surpassing the microprocessor's processing capacities. Exemplary algorithms for deep learning and ML are CNNs, generative adversarial network ("GAN") and long short-term memory ("LSTM"). The CNNs may ensure stable eye tracking. The GAN may be used to classify fields at each UI and capture a contextual understanding. The LSTM may be used to understand the sequence of the data entry from the first UI to the second, third, fourth and/or Nth UI.

The data orchestration engine 110 may also include an intelligent bulk data entry engine 112.

Intelligent bulk data entry engine 112 may work in synchronization with the data entry orchestration engine 110. The intelligent bulk data entry engine 112 may enable an understanding of the data entry fields that may be populated and/or filled at the UI. Over time, the system may understand the data entry pattern using deep learning. Based on the understanding, system may be enabled to, over time, enable a user to look at a first UI and transmit the data from the first UI to the second UI automatically.

The Intelligent bulk data entry engine 112 may be a software application that may execute a prediction algorithm based on historical data captured at a first UI and transferred to one or more second UIs and may develop a prediction algorithm of data transfer between the first UI and the one or more second UIs.

For example, the first UI may display a base home mortgage loan application. The prediction model may determine, based on past historical use data of the smart contact lens, that a User ID and a social security number displayed in the base home mortgage loan application is always copied, by the user, into a plurality of application form displayed on a plurality of second UI's. Thus, at a later point in time, when the first UI is captured by the smart lens, the intelligent bulk data entry engine 112 may automatically transmit a User ID and social security number displayed in the first UI into the plurality of second UIs without the user's eyes focusing on each UI The prediction algorithm and a set of training data may be stored in the memory of the smart contact lens. The training data may be data used to train the prediction algorithm. The training may include feeding the training data to a generic algorithm to compute the prediction algorithm. The training data may be historical data of prior-executed transfers of data from one or more first UIs to one or more second UI's. The historical data may list data entry fields and associated data entry field identifiers which were used to transfer data to specific UI's.

The intelligent bulk data entry engine 112 may execute bulk entry operations from one UI to another one or more second UIs. The intelligent bulk data entry engine 112 may execute the prediction algorithm and identify pages within an application that require a copy and paste of each data entry field on the page. When the page is displayed on the UI that the user's eye is focusing on, the prediction algorithm may enable the intelligent bulk data entry engine 112 to automatically capture all the data entry fields on the page, store them on the contact lens memory and transmit, through the LED of the contact lenses, each data entry field to the corresponding data entry fields at the second UI.

In some embodiments, the user may wish to override the prediction algorithm. The system may recognize specific eye blink gestures that may infer that an automatic capturing and transmitting may be cancelled and not be performed at this instance. For example, the system may detect three deliberate eye blink gestures one after another. This may initiate a cancelling of the automatic capturing and may enable the user to perform a single deliberate eye blink gesture at the data entry field of interest. In another example, a prolonged single deliberate eye blink gesture may infer an override. The prolonged single deliberate eye blink gesture may include a closing of the eyelid for a length of time greater than the length of time for a deliberate eye blink.

Lifi data transfer engine 114 may keep track of the way the data segment is captured to enable transmitting the data in the same form it was captured to the appropriate location on the second UI 118. The data segment may be transmitted using the LED at the smart contact lens to a Lifi receptor at the second terminal 118.

It should be appreciated that the data may be captured from the first UI 116 and transmitted to the second UI 118. The data may also be captured from the second UI 118 and then transmitted to the first UI 116.

Figure 2:
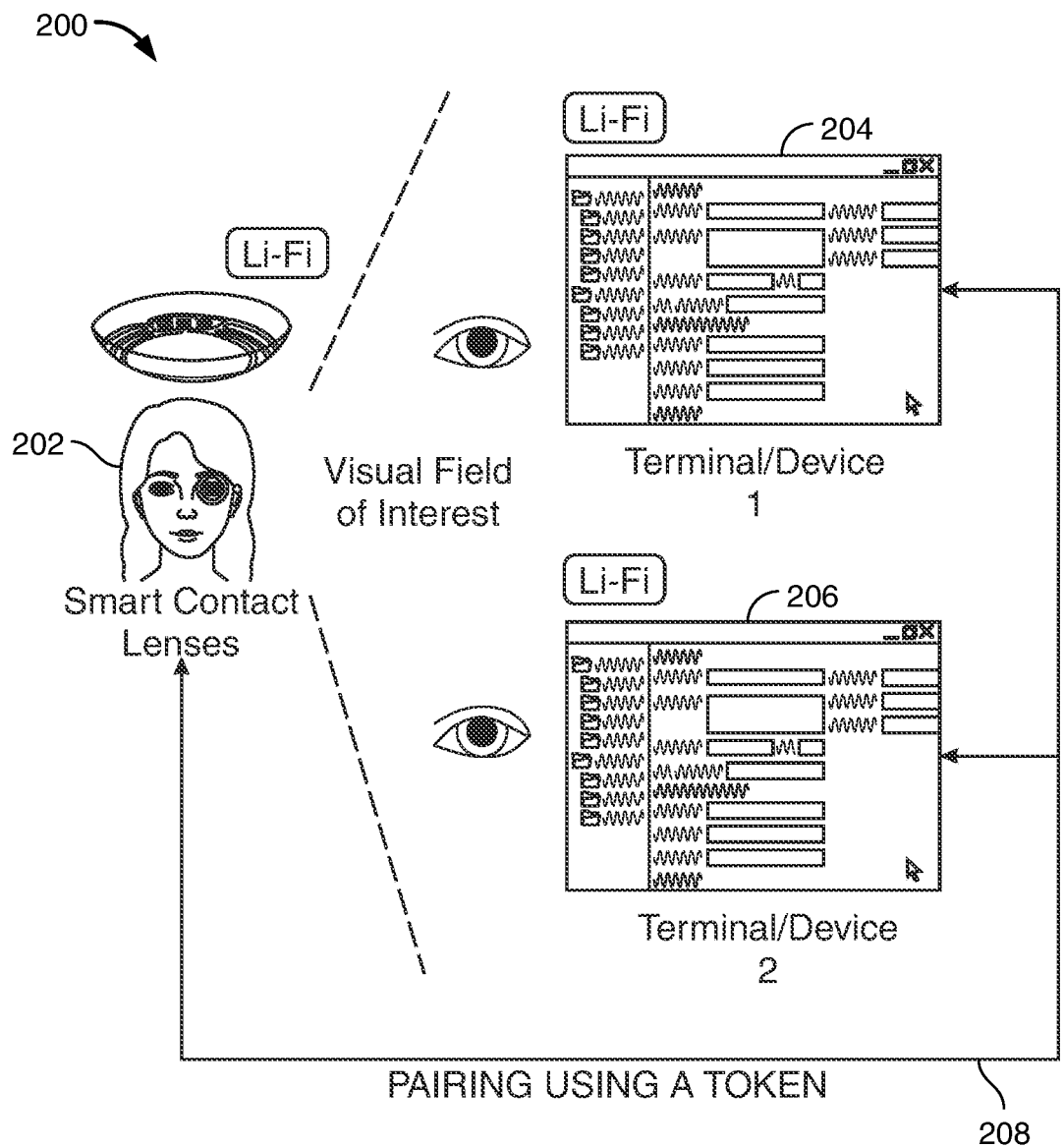
FIG. 2 shows an exemplary diagram in accordance with principles of the disclosure.

FIG. 2 shows an exemplary diagram 200 of the initial pairing of the smart contact lenses to the devices.

When smart contact lenses 202 is activated to begin capturing data from a first UI at a first terminal 204 to a second UI at a second terminal 206, prior to activation, the terminals may be paired with the smart contact lenses. The pairing may be enabled by a token, as shown at 208. The token may authenticate the smart contact lenses. The token may be a password stored at the smart contact lens and transmitted by LED to the first and second terminals. The terminals may authenticate the password and initiate the pairing of the devices.

In some embodiments, the user may manually input the password at each of the first UI and the second UI. The terminal may receive the password and may be configured to authenticate the user by the password. The terminal may combine biometric data from the user's eye and the transmitted password and compare it to stored data associated with the user stored at the terminal.

Additionally, the smart contact lenses may verify the user of the smart contact lenses before activating the eye tracking module. The smart contact lens may include an authentication application. User authentication may be based on one or more biometric factors, behavioral factors, touch or air gestures, or any suitable method or combination of methods.

Illustrative biometric factors include fingerprint, voiceprint, and iris recognition. Illustrative behavioral features include gait, head movements, and body movements.

Iris recognition may automatically enable the user of the smart contact lenses to be authenticated. The system may be enabled to automatically recognize the iris without the need for another device.

Figure 3:
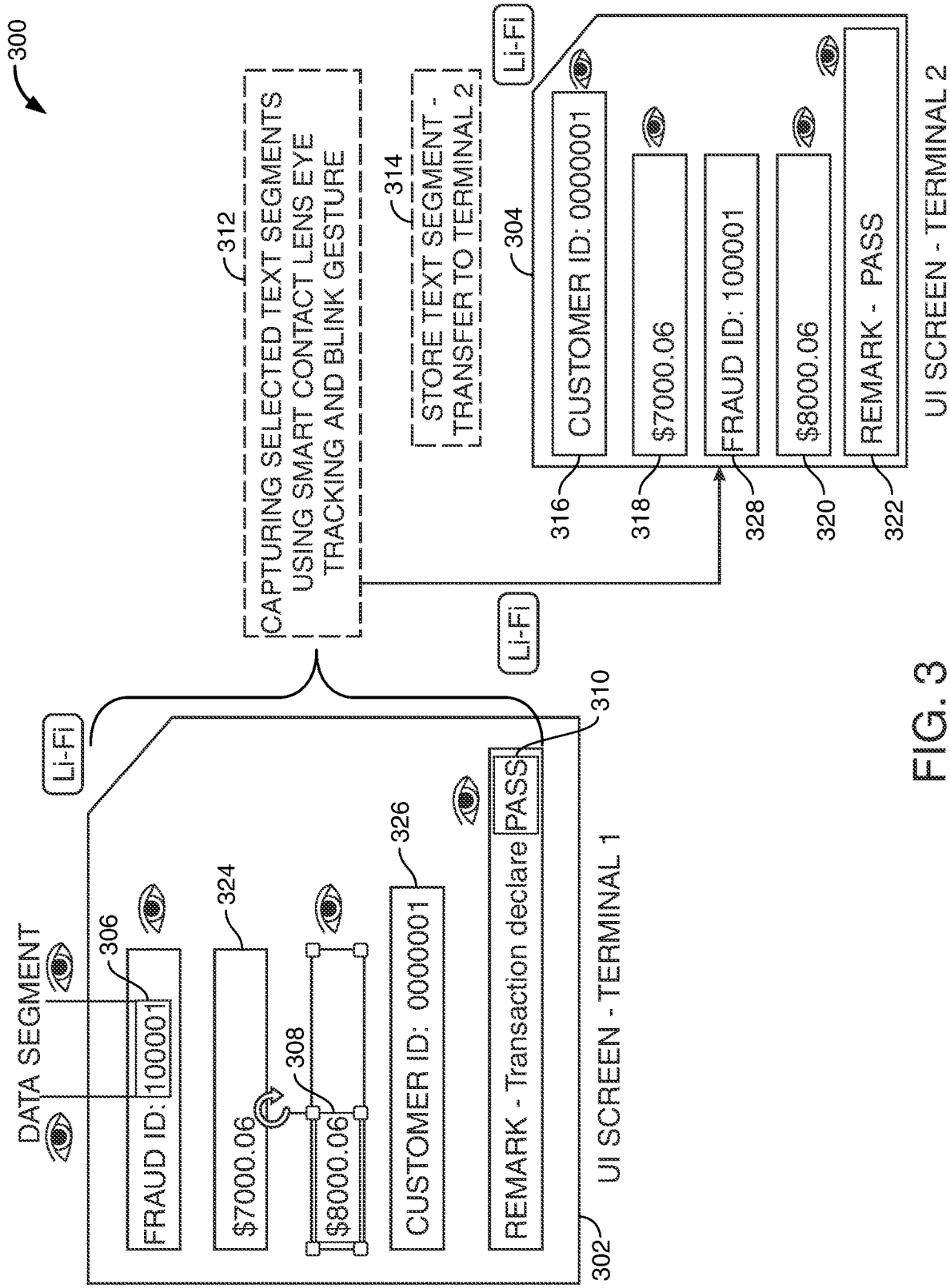
FIG. 3 shows an illustrative diagram in accordance with principles of the disclosure.

FIG. 3 shows an illustrative diagram 300 in accordance with principles of the disclosure. The illustrative diagram 300 shows data segments from data entry fields at UI screen 302 captured and transmitted using Lifi to data entry fields at UI screen 304.

UI screen 302 may display data associated with a customer. The customer ID may be displayed at 326. 'Customer ID' may be the data entry field identifier. '0000001' may be the value of the data entry field associated with the 'Customer ID.' Each value within each data entry field of the first UI 302 may need to be copied and pasted into UI screen 2 shown at 304.

In some embodiments, each data entry field may be captured by the user's eye, as shown at 312. Each captured data entry field may be stored at the smart contact lens, as shown at 314. Each captured data entry field may then be transmitted to the second terminal 304.

The user may direct the point of focus to the data entry field in accordance with principles of the disclosure. For example, data entry field 306 may display the 'Fraud ID' of the customer. The data segment captured may be '100001'. The user may direct the point of focus at 306. The user may initiate a first blink gesture at the start point '1' and a second blink gesture at the last number '1' of 306. The complete data segment '100001' may be captured.

Following the capturing, the data segment '100001' and the data entry field identifier 'Fraud ID' may be stored at the smart contact lens. When the user's point of focus is detected at the second UI, the stored data segment may be transmitted to the second UI and inputted at the point of focus. As shown at 328.

Data segment 324 may be captured, stored and then inputted at 318 on the second UI. Data segment 308 may be captured, stored and then inputted at 320 on the second UI. Data segment 326 may be captured, stored and then inputted at 316 on the second UI. Data segment 310 may be captured, stored and then inputted at 322 on the second UI.

In another embodiment, the system may be configured to identify, based on machine learning, that UI 302 may display data associated with a customer. The system may recognize that each data entry field may need to be captured. The system may be configured to perform a bulk capturing on the first UI. The system may capture each data entry field on the first UI screen 302, store the data, and then input each data entry field into the second UI. The bulk capturing may be automated and may be performed without capturing a point of focus of the user's eye.

Figure 4:
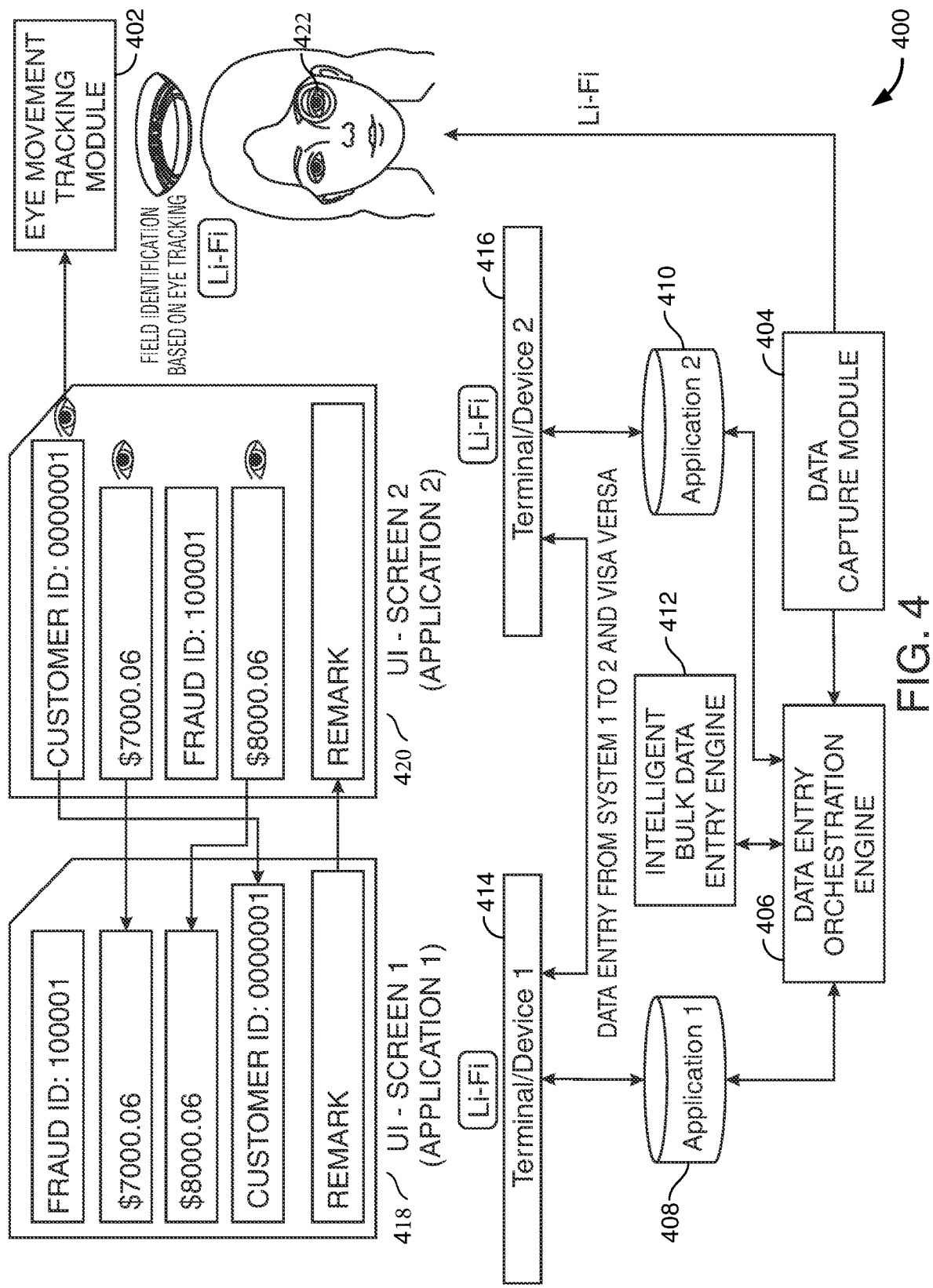
FIG. 4 shows illustrative systems and methods in accordance with principles of the disclosure.

FIG. 4 shows systems and methods 400 in accordance with principles of the disclosure. FIG. 4 may display the systems and methods for capturing data from one terminal and pasting the data into a second terminal. It should be appreciated that the data may be captured from UI at terminal 414 and pasted into UI at terminal 416. The data may be captured, vice versa, from UI at terminal 416 and pasted into UI at terminal 414.

Terminal 414 and terminal 416 may include Lifi capabilities. Smart contact lens 422 may also include Lifi, using an LED embedded on the smart contact lens 422.

At 402, eye movement tracking module may track the focus of the user's eye. The point of focus may be directed at UI 420. The point of focus may be directed at UI 418. Data capture module 404 may capture the segment of data from the point of focus. Data entry orchestration engine 406 may be configured to, in combination with intelligent bulk data entry engine 412, ensure that the user's eye focus position and tracking is in synchronization with the data segment captured. Additionally, data entry orchestration engine 406 may ensure that the data segment captured is appropriately transferred to the other terminal. Each data entry activity and the sequence may be tracked by the data entry orchestration engine and intelligent bulk data entry engine.

The data segment may be stored in memory as shown at 408 and 410 of the smart contact lens. Memory may include data segments captured from application 1 at UI 418. Memory may include data segments captured from application 2 at UI 420. The data segments stored may be transmitted to the correlating data entry field within either one of UI 418 or UI 420 or both UI 418 and UI 420.

Thus, methods and apparatus for transferring data from a first UI to a second UI using a smart contact lens is provided. Persons skilled in the art will appreciate that the present invention can be practiced by other than the described embodiments, which are presented for purposes of illustration rather than of limitation, and that the present invention is limited only by the claims that follow.

What is claimed is:

1. A data entry system leveraging smart contact lenses, the data entry system comprising:
   a first terminal supporting a first user interface ("UI") and comprising a light fidelity ("Lifi") receiver;
   a second terminal supporting a second UI and comprising a Lifi receiver;
   a smart contact lens configured for location on an eye of a user, the smart contact lens comprising:
      a micro camera operable to capture data from the first UI and from the second UI;
      a memory for storing the data captured from the first UI and from the second UI;
      one or more sensors configured to capture the user's point of focus;
      a loop antenna configured to enable radio frequency communication;
      a light emitting diode ("LED") attached to a substrate on the smart contact lens, the LED connected to a microcontroller, the LED operable to transmit the data captured at the first UI to the second terminal; and
      a microprocessor operable to capture, store and transmit data to the Lifi receiver at the first terminal and the second terminal;
   the smart contact lens, via the microprocessor, is configured to execute a plurality of applications comprising executable instructions stored in a non-transitory memory on the smart contact lens, the plurality of applications comprising:
      an eye movement tracking application configured to:
         determine a focus of the user's eye on the first UI;
         determine a point of focus of the user's eye on the first UI, the point of focus directed to a data entry field associated with a data entry field identifier within the first UI;
         detect a deliberate eye blink gesture while gazing at the point of focus; and
         in response to the detection, identify a data segment at the point of focus within the data entry field;
      a data capturing application configured to:

capture the data segment and the associated data entry field identifier using the micro camera; and prior to storing the data segment, prompt the user of the smart contact lens to confirm an accuracy of the data segment, the confirming comprising:

instructing a display on the smart contact lens to trigger an augmented reality display to the user of the data segment;

when a single deliberate eye blink gesture is detected, confirming verification from the user and storing the data segment in the memory of the smart contact lens;

when a double deliberate eye blink gesture is detected:

instructing the display to trigger the augmented reality display to the user confirming a deletion of the data segment;

in response to a confirmation of the deletion, deleting the data segment from the memory;

executing the data capturing application to determine a second point of focus of the user's eye on the first UI;

identifying the data segment at the second point of focus; and storing the data segment identified at the second point of focus and the associated data entry field identifier in the memory of the smart contact lens;

wherein, in response to a detection of the point of focus of the user's eye on the second UI:

the eye movement tracking application is further configured to detect a deliberate eye blink gesture while gazing at the point of focus at the second UI;

a Lifi data transfer engine configured to, using the LED, transmit a data packet compiled at the smart contact lens to the second terminal, the data packet including the stored data segment, the associated data entry field identifier from the smart contact lens and an instruction to update the second UI to incorporate the data segment at the point of focus of the user's eye on the second UI;

the Lifi receiver at the second terminal is configured to receive the data packet; and a processor at the second terminal configured to update the second UI by inputting the data segment at the point of focus at the second UI.

2. The system of claim 1 wherein prior to capturing data from the first UI the system further comprises authenticating the user of the smart contact lens, the authenticating comprising performing an iris recognition scan on the user's eye.

3. The system of claim 2 wherein following the authenticating, the system further comprises pairing the smart contact lens with the first terminal and the second terminal.

4. The system of claim 1 wherein the deliberate eye blink gesture is determined when a time period of a blink of the eye is greater than a pre-determined time period.

5. The system of claim 1, wherein the system further comprises a third terminal supporting a third UI, and following the inputting of the data segment at the point of focus at the second UI, the system is further configured to:

detect a deliberate eye blink gesture while gazing at a point of focus at the third UI;

the LED is configured to transmit a data packet compiled at the smart contact lens to the third terminal, the data packet including the data segment, the associated data entry field identifier from the smart contact lens and an instruction to update the third UI to incorporate the data segment at the point of focus of the user's eye on the third UI;

the Lifi receiver at the third terminal is configured to receive the data packet; and a processor at the third terminal configured to update the third UI by inputting the data segment at the point of focus at the third UI.

6. The system of claim 1 wherein the smart contact lens is a first smart contact lens for a first eye and the system further comprises a second smart contact lens for a second eye.

7. One or more non-transitory computer-readable media storing computer-executable instructions which, when executed by a processor on a computer system, perform a method for transferring data from a first light fidelity ("Lifi") enabled user interface ("UI") to a second Lifi enabled UI, the transferring leveraging smart contact lenses via Lifi transmission, the smart contact lenses positioned on a user's eyes, the method comprising:

detecting a focus of the user's eyes on the first UI;

in response to the detecting, triggering a tracking of the focus of the user's eyes;

when a first deliberate blink gesture is identified, tracking a start point of the focus of the user's eyes;

when a second deliberate blink gesture is identified, tracking an end point of the focus of the user's eyes;

capturing a data segment within the start point of focus and the end point of focus;

storing the data segment in memory on the smart contact lenses;

detecting the focus of the user's eyes on the second UI;

in response to the detecting, tracking a point of focus of the user's eyes on the second UI; and transmitting to the second UI, using a light emitting diode ("LED"), a data packet including:

the data segment stored in the memory;

the point of focus of the user's eyes on the second UI; and an instruction to update the second UI to incorporate the data segment at the point of focus of the user's eyes on the second UI;

prior to updating the second UI:

verifying that the point of focus of the user's eyes on the second UI is pointing at a data entry field associated with a data entry field identifier correlating to the data entry field identifier on the first UI; and in an event that the data entry field associated with a data entry field identifier on the second UI does not correlate to the data entry field identifier on the first UI, retracking the point of focus of the user's eyes on the second UI; and following the verifying, updating the second UI based on the instruction by inputting the data segment at the point of focus on the second UI.

8. The method of claim 7 wherein the first deliberate blink gesture is determined when a time period of a blink of the eyes is greater than a pre-determined time period.

9. The method of claim 7 wherein, following the updating, the method further comprises:

detecting the focus of the user's eye on a third UI of a third terminal;

tracking a point of focus of the user's eyes on the third UI; and transmitting the data packet from the memory to the third UI.

10. The method of claim 9 wherein following transmitting of the segment of data into the third UI, the method further comprises identifying pre-trained data associated with the data segment and automatically transmitting the data packet to a fourth, fifth and sixth UI based on the pre-trained data.

11. The method of claim 7 wherein the segment of data is within a data entry field associated with a data entry field identifier on the first UI.

12. The method of claim 7 wherein when the start point of the focus of the user's eyes is at a first data entry field on the first UI and the end point of the focus of the user's eyes is at a last data entry field on the first UI, the method comprises performing a bulk capturing, the bulk capturing comprising:
- capturing each data segment within each data entry field on the first UI;
- capturing, for each data segment, an associated data entry field identifier displayed on the first UI;
- storing each data segment and the associated data entry field identifier on the smart contact lens;
- detecting the focus of the user's eyes on the second UI;
- in response to the detecting, transmitting to the second UI using Lifi, a data packet including:
  - each data segment and the associated data entry field identifier stored in the memory; and
  - an instruction to update the second UI, wherein for each data segment being transmitted, inputting each data segment on the second UI within a data entry field associated with a data entry field identifier correlating to the data entry field identifier displayed on the first UI; and
- updating the second UI based on the instruction.

13. The method of claim 7 wherein the first UI is located on a first computing device and the second UI is located on a second computing device, wherein the first and second computing device are independent of each other and are not wirelessly linked to each other.

14. A smart contact lens configured for capturing data from a first user interface ("UI") and transmitting the data to a second UI, the transmitting leveraging light fidelity ("Lifi"), the smart contact lens located on an eye of a user, the smart contact lens comprising:
- a micro camera operable to capture data from the first UI and from the second UI;
- a memory for storing the data captured from the first UI and from the second UI;
- a sensor configured to capture the user's point of focus;
- a loop antenna configured to enable radio frequency communication;
- a light emitting diode ("LED") attached to a substrate on the smart contact lens, the LED connected to a microcontroller, the LED operable to transmit the data captured at the first UI to a second terminal supporting the second UI;
- a microprocessor operable to capture, store and transmit data to a Lifi receiver at a first terminal and a Lifi receiver at the second terminal, the first terminal supporting the first UI;

wherein, when the sensor detects a point of focus of the user's eye on the first UI, the microprocessor is operable to:
execute an eye movement tracking application configured to:
- determine the point of focus of the user's eye on the first UI, the point of focus directed to a data entry field associated with a data entry field identifier within the first UI;
- detect a deliberate eye blink gesture while gazing at the point of focus; and
- in response to the detection, identify a data segment at the point of focus within the data entry field;

execute a data capturing application configured to:
- capture the data segment and the associated data entry field identifier using the micro camera; and
- prior to storing the data segment, prompt the user of the smart contact lens to confirm an accuracy of the data segment, the confirming comprising:
  - instructing a display on the smart contact lens to trigger an augmented reality display to the user of the smart contact lens of the data segment;
  - when a single deliberate eye blink gesture is detected, confirming verification from the user and storing the data segment in the memory of the smart contact lens;
  - when a double deliberate eye blink gesture is detected:
    - instructing the display to trigger the augmented reality display to the user confirming a deletion of the data segment;
    - in response to a confirmation of the deletion, deleting the data segment from the memory;
    - executing the data capturing application to determine a second point of focus of the user's eye on the first UI;
    - identifying the data segment at the second point of focus; and
    - storing the data segment identified at the second pint of focus and the associated data entry field identifier in the memory of the smart contact lens;

in response to a detection of the point of focus of the user's eye on the second UI:
- the eye movement tracking application is further configured to detect a deliberate eye blink gesture while gazing at the point of focus at the second UI;
- the LED is configured to transmit a data packet compiled at the smart contact lens to the second terminal, the data packet including the stored data segment, the associated data entry field identifier from the smart contact lens and an instruction to update the second UI to incorporate the data segment at the point of focus of the user's eye on the second UI;
- the Lifi receiver at the second terminal is configured to receive the data packet; and
- a processor at the second terminal configured to update the second UI by inputting the data segment at the point of focus at the second UI.

15. The smart contact lens of claim 14 wherein the smart contact lens is a first smart contact lens on a first eye and the system further comprises a second smart contact lens on a second eye of the user.

* * * * *